March 12, 1963     E. OROWAN     3,081,127
SAFETY WINDSHIELD FOR MOTOR VEHICLES
Filed Feb. 10, 1960     2 Sheets-Sheet 1

*INVENTOR.*
EGON OROWAN
BY
Dike, Thompson & Bronstein
ATTORNEYS

United States Patent Office 3,081,127
Patented Mar. 12, 1963

3,081,127
SAFETY WINDSHIELD FOR MOTOR VEHICLES
Egon Orowan, 44 Payson Terrace, Belmont, Mass.
Filed Feb. 10, 1960, Ser. No. 7,910
6 Claims. (Cl. 296—84)

The present invention relates to an improvement in the design of motor vehicle bodies, and more particularly to a safety windshield assembly for motor vehicles. Its purpose is to reduce the chance of serious injury in cases where passengers are thrown against the windshield in a collision.

Many attempts have been made to make windshields safer. In spite of considerable improvements, however, the windshield is still one of the two most dangerous causes of injury in accidents. If it is very strong (e.g., if it is made of thick strongly tempered glass), it resists the impact of the passenger's body and it can inflict injuries comparable to those caused by flying against a solid wall. If it breaks, or flies out of its frame, before its pressure upon the body of the passenger reaches a dangerous magnitude, the passenger may fly out of the car and suffer serious injury outside. Laminated safety windshields with a rubbery interlayer can absorb considerable energy before they are penetrated; however, the length of the path over which they can decelerate the body of the passenger without penetration is of the order of magnitude of an inch, whereas calculation has shown that a path at least of the order of a foot is required for absorbing the kinetic energy of the passanger's body at average speeds without dangerous pressure forces, in addition to the average path over which the windshield itself is decelerated relatively to the earth by the deformation of the bumpers, the crumpling of the car body, and possibly of the object with which the car collides. If the windshield is penetrated by the head of the passenger, its fragments usually inflict disfiguring or fatal injuries.

For the above reasons, no substantial improvement of safety can be expected from further modifications of the windshield itself.

The present invention provides a windshield assembly which, in the event of a collision or of sudden stopping of the vehicle for other reasons, is effective to decelerate the passanger over a long path by relatively small pressure forces, and to prevent penetration of the windshield by the body of the passenger and consequent injury due to fragments of the windshield. The windshield assembly according to the invention fulfills the additional requirements of being inexpensive, involving no significant modification of the vehicle body, being invisible before it comes into action, requiring no attention on the part of the passenger, and causing no inconvenience such as has prevented the widespread use of the seat belt.

Other objects and advantages will be apparent from the following description and the accompanying drawings in which FIG. 1 is a diagrammatic view of a section in elevation of a portion of a vehicle comprising an embodiment of the present invention;

Figure 3:
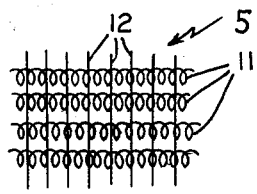
FIG. 3 is a diagrammatic view of a portion of the element used in FIGS. 1 and 2 to apply the above mentioned decelerating force to the passenger and at the same time to prevent the passenger from flying out of the vehicle and from being injured by fragments of the windshield.
Figure 5:
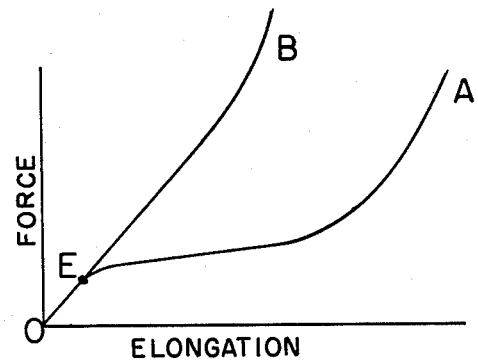
Figure 6:
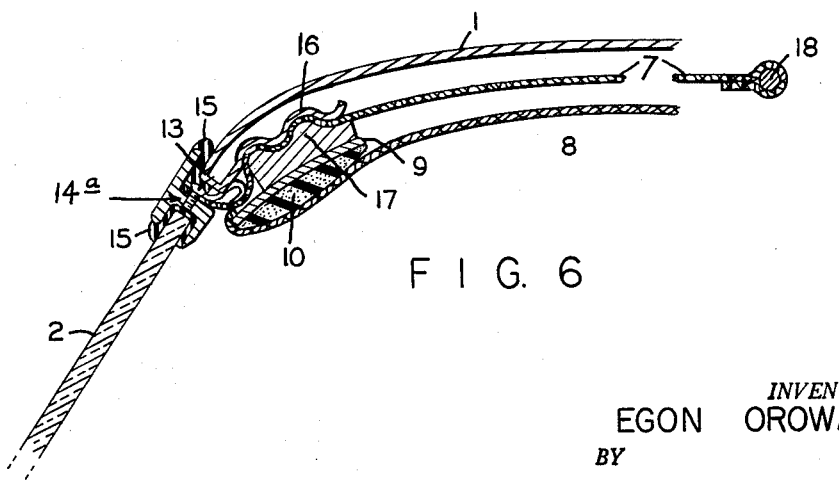

FIG. 5 shows the relationship between the decelerating force and the displacement of the windshield for the element shown in FIG. 3 comprising helices of ductile metal wire, compared with the corresponding relationship for elastic helical springs, and illustrates the physical basis utilized for decelerating the passenger at a safe rate; and FIG. 6 is a section through the upper part of the frame of the windshield and the adjoining part of the roof, illustrating another embodiment of the invention utilizing friction rather than plasticity for resisting the forward movement of the windshield.

Figure 1:
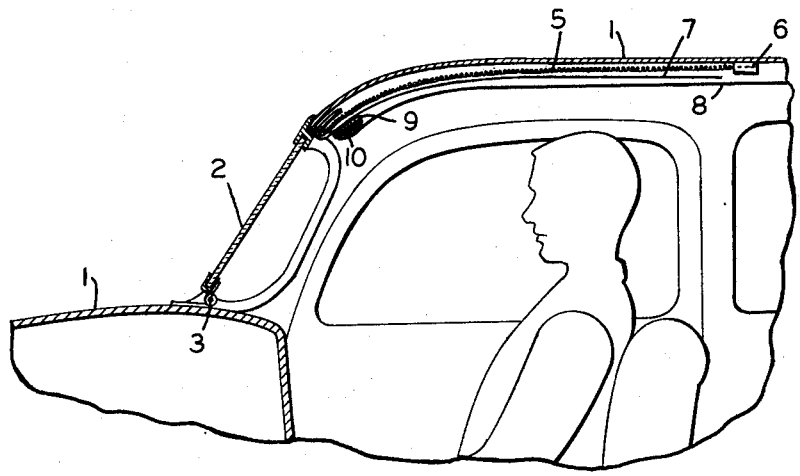
Figure 2:
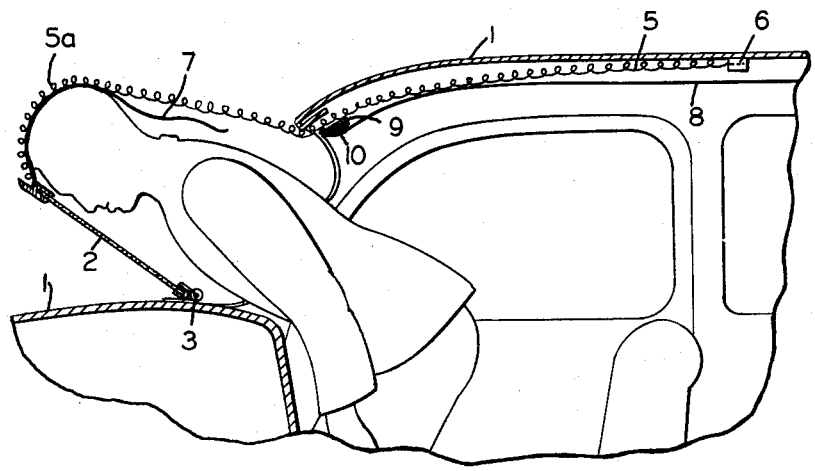
FIG. 2 is like FIG. 1 during or after a collision and shows how the windshield construction of the present invention protects and safely decelerates the passenger.

In FIGS. 1 and 2 the windshield 2 is connected with the body 1 of the vehicle by hinges 3 at its lower edge. It is seated on the vehicle body along its periphery and secured to it by spring catches 4 shown in FIG. 4 which release the windshield and its frame when the forward forces acting upon it during a collision reach a critical magnitude, and enable it to swing forward as shown in FIG. 2. Its forward movement is resisted by a sheet of fabric 5 of whcih one edge is secured to the upper edge of the windshield and the opposite edge to the roof of the vehicle through a metal strip 6. The warp 11 of the fabric, shown in FIG. 3, consists of closely wound thin coils of a ductile metal wire (for instance, of aluminum or soft low carbon steel wire); its woof 12 may be of cotton, nylon, or any other suitable textile material. Instead of a coil the wire of the warp can be in the form of a zigzag or any other form providing high extensibility. The opposite ends of the metal coil warp are secured to the edge of the windshield and to the roof of the vehicle respectively, so that the ductile metal coils are stretched beyond their elastic limit after a small forward swing of the windshield. Curve OA in FIG. 5 shows the force required for substantially plastic stretching of a ductile metal coil, as a function of its elongation. If the coil was purely elastic, the force would be given by curve OB, consisting of a steeply rising straight initial part followed by an upward curvature due to the straightening of the coils. The two curves branch apart at the elastic limit E; beyond E the force curve of the ductile metal coil flattens out because plastic deformation takes place at very slowly rising stress. After a large elongation the curve rises more steeply as the coils straighten gradually. The plastic force curve OA of the ductile coil and the number of coils in the band 5 determine the decelerating force acting upon the windshield and the body of the passenger. By a suitable choice of the material of the coils, of the diameters of wire and coil, of the number of coils in the warp, and of the length of the fabric band 5, any desired level of decelerating force acting over the flat portion of the curve OA can be obtained. In particular, by a suitable choice of the material and of the dimensions and number of the warp coils the decelerating force over approximately the first half of the full swing of the windshield can be kept at a level at which the wieldshield remains unbroken and its pressure upon the passenger does not reach a dangerous magnitude while the decelerating force is kept as high as is compatible with these two conditions. Thus in a collision the windshield opens and the passenger slides over the intact glass panel upward and forward until his head passes beyond the upper edge of the windshield and is caught in the soft pouch 5a formed by the bulge of the extended fabric as shown in FIG. 2. If the collision is a violent one and the passenger is not decelerated to standstill over the flat part of the curve OA in FIG. 5, the steeply rising part of the curve comes into action and the pressure rises gradually to the magnitude required for complete deceleration. At this stage the head and part of the body of the passenger are in the protruding pouch of soft and pliable fabric, and the final phase of deceleration takes place under the most favorable conditions possible. Even if in this phase the windshield shatters, the passenger is not shot through the jagged opening and is protected from flying glass fragments by the metal coils. The band thus forms a life-net in which the passenger is protected and gently decelerated.

Another advantage of the plastic-ductile coils is that they do not throw the passenger back into the car after completed deceleration, which would be the case if the kinetic energy of his body were stored in the form of elastic energy in substantially elastic springs. Another advantage is that the resistance of metals to plastic deformation does not depend much on the temperature. Thus, the force exerted by the ductile metal wire coils in FIGS. 1, 2, and 3 is substantially the same under all climatic conditions.

Figure 4:
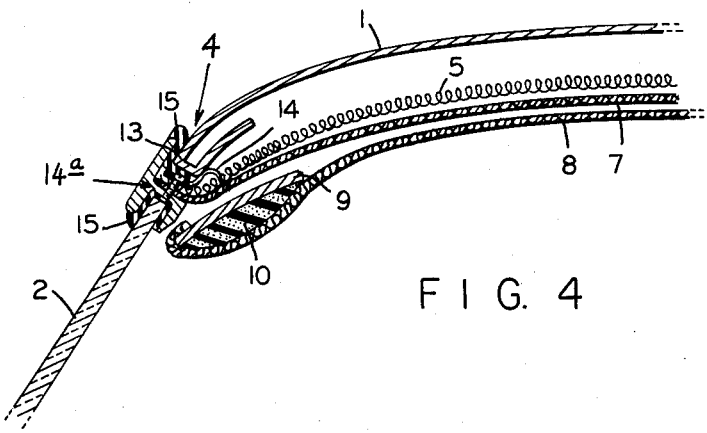
FIG. 4 is a section through the top part of the windshield frame and its seat in the vehicle body, comprising a spring lock pressing the windshield upon its seat and opening when the force acting upon the windshield reaches a critical magnitude.

Since the metal coils of the fabric 5 may cause abrasions of the skin in violent collisions, a soft blanket 7 is used to prevent contact between the coils and the skin. It is fastened to the upper edge of the windshield together with the fabric sheet 5 as seen in FIG. 4; its opposite end may reach back to the metal strip 6 without being fastened to it, so that the blanket 7 can move freely wtih the windshield. Both the expanding fabric 5 and the blanket 7 are concealed behind the lining 8 of the vehicle roof which is fastened behind the top edge of the windshield to a transverse metal arch 9 under the front edge of the roof provided with padding 10 to protect the passenger in the case of impact against it.

Particularly if a blanket 7 is used underneath the expanding fabric, it is not essential to connect the metal coils by a woof; the fabric may be reduced to a multiplicity of parallel extensible elements such as 11 in FIG. 3. The expressions "fabric" and "band" as used herein include arrangements of parallel extensible elements not joined together by a transverse woof.

Before the safety device comes into action, the windshield is held against and secured to its seat 13 by springs 14 attached to the windshield frame 14a shown in FIG. 4. Springs 14 release the windshield when the pressure and inertia forces acting upon it in forward direction reach a magnitude somewhat higher than the forces that may act upon it in normal operation of the vehicle. By means of the spring locks 4 and gaskets 15 a reliable seal between the windshield and the vehicle body is obtained. After an accident involving expansion of the connecting band 5, the expanded band can be tucked behind the lining 8 of the roof, the windshield locked to its seat by the spring locks, and the car used normally without the necessity of changing the expanded fabric immediately.

Naturally, the fabric band 5 explained with reference to FIGS. 1, 2, and 3 is not the only way of utilizing the properties of plastic deformation for producing a resistance to the displacement of the windshield that does not rise rapidly with the displacement and is not greatly influenced by either temperature or velocity. Any design that involves sufficient plastic deformation in a structural part of ductile metal or other ductile, crystalline material during the forward movement of the windshield can be used for achieving the same end. Thus, the hinges at the lower edge of the windshield can be replaced by strips of such metal connecting the windshield with the vehicle body. When the windshield moves forward during an accident, the strips replacing the hinges bend and exert a substantially plastic resistance to the movement of the windshield. In addition, of course, there must be a separate connection between the upper edge of the windshield and the roof of the vehicle in the form of a pliable band replacing the extensible fabric 5 to prevent the passenger from flying out of the car. The blanket 7 can be utilized for this purpose if it is made long enough to follow the forward movement of the windshield and form a life-net for the passenger, provided that its rear end is secured to the roof, the excess length being folded up between the roof and its lining before the windshield swings forwardly. It is of advantage if, in addition, the movement of the pliable band as it is pulled out by the windshield from under the roof is resisted by a plastic force. For instance, ductile metal coils similar to those explained in reference to FIG. 3 may be used to connect the rear end of the pliable band with the roof of the vehicle.

The extensible fabric described in connection with FIGS. 1, 2, and 3 makes use of ductile metal wires for providing the desirable characteristics of plastic deformation, in particular, the slow rise of stress during a wide range of deformation. It is known that plasticity, defined as a deformation governed essentially by an irreversible functional relationship between stress and strain as expressed in the familiar plastic stress-strain curve, is a property common to ductile crystalline materials, including crystalline polymers such as nylon, polyethylene, polyvinyl chloride, and polyvinylidene chloride. Most crystalline polymers have the property of "cold drawing," i.e., of stretching by considerable amounts at constant or only slightly rising force. Such polymers can be used instead of the metal wire coils for the warp of the extensible band 5 in FIGS. 1 and 2. Alternatively, the band can be made of a sheet of a crystalline polymer capable of being cold drawn, or a fabric woven of such a polymer.

It is important that the windshield be capable of moving forward sufficiently to provide an opening which is at least large enough to accommodate the passenger's head and that the force resisting such movement should act during the entire course of this movement. For example, where plastic deformation is used, the resisting element or elements, e.g. the metal coils in FIGS. 1 to 3, should be capable of deformation large enough to comply with the necessary movement of the windshield without rupturing.

In the form of the device shown in FIGS. 1 and 2 the frame of the windshield is hinged to the body of the vehicle. The hinges can be replaced by any of a number of suitable devices; one example, already mentioned, is the replacement of the hinges by metal sheet strips which bend when the windshield moves. Alternatively, the windshield may be secured to its seat only by spring locks like those shown in FIG. 4 or other types of locks released by a certain force, and two or more sides of the windshield frame may be connected with the body of the vehicle by pliable bands in the manner previously described for the band connecting the upper edge of the windshield with the roof of the vehicle in the embodiment of the invention shown in FIGS. 1 and 2.

I claim:

1. A windshield asesmbly for vehicles comprising a windshield releasably mounted on the body of the vehicle so as to be capable of readily moving forward with respect to the body upon sudden deceleration, or by the application of a forward acting force such as exerted by the body of an occupant of such vehicle, to provide an opening sufficient to accommodate a human body; and means comprising a ductile crystalline band-type member connected at one end to the windshield and anchored at its other end to the vehicle body, said member undergoing plastic deformation while being stretched by the forward movement of the windshield and/or occupant.

2. A windshield assembly according to claim 1, said band-type member comprising a plurality of bent ductile wires.

3. A windshield assembly according to claim 1, said band-type member being substantially coextensive with the widths of the windshield to provide a plastically yieldable pouch for retaining said human body.

4. A windshield assembly accordnig to claim 1, an edge of the windshield being pivotally connected with the body of the vehicle, said movement being about said pivotal connection, whereby the opposite edge of said windshield to which said band type member is connected moves away from the body of the vehicle to form said opening.

5. An assembly according to claim 1, including a soft layer of protective material located along the inner surface of said band-type member.

6. An assembly according to claim 1, said band-type member being in the form of coils of a ductile metal wire.

References Cited in the file of this patent

UNITED STATES PATENTS

| | | |
|---|---|---|
| 2,200,936 | Ruesch | May 14, 1940 |
| 2,715,042 | Lancaster | Aug. 9, 1955 |
| 2,907,602 | Lagerling | Oct. 6, 1959 |
| 2,923,558 | Groenewegen | Feb. 2, 1960 |